US012615530B2

(12) United States Patent
Wei et al.

(10) Patent No.: US 12,615,530 B2
(45) Date of Patent: Apr. 28, 2026

(54) INFORMATION ACQUISITION AND CONFIGURATION METHODS AND APPARATUSES, AND COMMUNICATION DEVICE

(71) Applicant: VIVO MOBILE COMMUNICATION CO., LTD., Dongguan (CN)

(72) Inventors: Xusheng Wei, Dongguan (CN); Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 290 days.

(21) Appl. No.: 18/376,866

(22) Filed: Oct. 5, 2023

(65) Prior Publication Data

US 2024/0040410 A1     Feb. 1, 2024

Related U.S. Application Data

(63) Continuation of application No. PCT/CN2022/085518, filed on Apr. 7, 2022.

(30) Foreign Application Priority Data

Apr. 9, 2021     (CN) .......................... 202110382496.3

(51) Int. Cl.
*H04W 24/08*          (2009.01)
(52) U.S. Cl.
CPC .................................. *H04W 24/08* (2013.01)
(58) Field of Classification Search
CPC ..... H04W 24/08; H04W 24/10; H04W 72/23; H04W 76/28
See application file for complete search history.

(56) References Cited

U.S. PATENT DOCUMENTS

| | | | |
|---|---|---|---|
| 11,528,619 | B2 | 12/2022 | Chen |
| 2019/0182000 | A1 | 6/2019 | Futaki |
| 2019/0230549 | A1 | 7/2019 | Wang et al. |
| 2020/0296612 | A1 | 9/2020 | Ma et al. |
| 2020/0374725 | A1 | 11/2020 | Chen et al. |
| 2021/0045003 | A1 | 2/2021 | Li et al. |
| 2021/0160835 | A1 | 5/2021 | Gao et al. |
| 2022/0050163 | A1 | 2/2022 | Si et al. |

(Continued)

FOREIGN PATENT DOCUMENTS

| | | |
|---|---|---|
| CN | 109413671 A | 3/2019 |
| CN | 109788492 A | 5/2019 |

(Continued)

OTHER PUBLICATIONS

Intel Corporation, "Stage 2 CR on Measurement gap configuration scenarios", 3GPP TSG-RAN2 Meeting #104, Spokane, US, Nov. 12-16, 2018, R2-1817703.

(Continued)

*Primary Examiner* — Sam Bhattacharya
(74) *Attorney, Agent, or Firm* — The Webb Law Firm

(57)          ABSTRACT

An information acquisition method includes obtaining, by a terminal, indication information, where the indication information is used for indicating measurement gap configuration information of each of N BWPs, and N is a positive integer; and performing, by the terminal, measurement according to the measurement gap configuration information.

20 Claims, 4 Drawing Sheets

Start

A network side device sends indication information, where the indication information is used for indicating measurement gap configuration information of each of N bandwidth parts BWPs, and N is a positive integer     401

End

(56)                    References Cited

U.S. PATENT DOCUMENTS

| | | | |
|---|---|---|---|
| 2022/0060923 | A1 | 2/2022 | Zheng et al. |
| 2022/0174623 | A1 | 6/2022 | Zheng et al. |
| 2022/0322308 | A1* | 10/2022 | He ...................... H04L 41/0896 |

FOREIGN PATENT DOCUMENTS

| | | | |
|---|---|---|---|
| CN | 109788497 | A | 5/2019 |
| CN | 110831167 | A | 2/2020 |
| CN | 111342943 | A | 6/2020 |
| CN | 111385842 | A | 7/2020 |
| CN | 111918303 | A | 11/2020 |
| WO | 2020015563 | A1 | 1/2020 |
| WO | 2020086514 | A1 | 4/2020 |
| WO | 2020211094 | A1 | 10/2020 |
| WO | 2020253744 | A | 12/2020 |
| WO | 2022198641 | A1 | 9/2022 |
| WO | 2022212984 | A1 | 10/2022 |

OTHER PUBLICATIONS

Qualcomm CDMA Technologies, "Realizing pre-configured MG via network controlled fast gap(NCFG)", 3GPP TSG-RAN WG4 Meeting #98-bis-e, Electronic Meeting, Apr. 12-20, 2021, R4-2107347.
Samsung. "RRM measurement configuration for BWP in NR", 3GPP TSG-RAN WG2 NR #101 Meeting, Athens, Greece, Feb. 26-Mar. 2, 2018, R2-1802466.
Vivo, "On pre-configured MG patterns", 3GPP TSG-RAN WG4 Meeting #98-e, Electronic Meeting, Apr. 12-20, 2021, R4-2104635.
Wang, Hongwei et al., "Research of TD-LTE/TD-SCDMA Dual Mode Terminal Handover Procedure", TD-LTE TD-SCDMA, Information Terminal & Display, 2013, vol. 37, No. 3, Abstract.

* cited by examiner

INFORMATION ACQUISITION AND CONFIGURATION METHODS AND APPARATUSES, AND COMMUNICATION DEVICE

CROSS-REFERENCE TO RELATED APPLICATIONS

This application is a Bypass Continuation Application of International Application No. PCT/CN2022/085518, filed Apr. 7, 2022, and claims priority to Chinese Patent Application No. 202110382496.3, filed Apr. 9, 2021, the disclosures of which are hereby incorporated by reference in their entireties.

BACKGROUND OF THE INVENTION

Field of the Invention

The present application relates to the field of communications technologies, and to information acquisition and configuration methods and apparatuses, and a communication device.

Description of Related Art

Conformance evaluation of radio resource management (RRM) mainly aims at testing whether a terminal meets a minimum requirement defined by the standards in terms of performance. A conformance test is of great significance to ensure the interconnection of a network and guarantee the user experience of the terminal. In an RRM measurement, for inter-frequency measurement and inter-band measurement, a gap needs to be introduced to perform the measurement.

SUMMARY OF THE INVENTION

Embodiments of this application provide information acquisition and configuration methods and apparatuses and a communication device.

A first aspect provides an information acquisition method, including:

obtaining, by a terminal, indication information, where the indication information is used for indicating measurement gap configuration information of each of N bandwidth parts BWPs, and N is a positive integer; and performing, by the terminal, measurement according to the measurement gap configuration information.

A second aspect provides an information configuration method, including:

sending, by a network side device, indication information, where the indication information is used for indicating measurement gap configuration information of each of N bandwidth parts BWPs, and N is a positive integer.

A third aspect provides an information acquisition apparatus, including:

a first acquisition module, configured to obtain indication information, where the indication information is used for indicating measurement gap configuration information of each of N bandwidth parts BWPs, and N is a positive integer; and a measurement module, configured to perform measurement according to the measurement gap configuration information.

A fourth aspect provides an information configuration apparatus, including:

a first sending module, configured to send indication information, where the indication information is used for indicating measurement gap configuration information of each of N bandwidth parts BWPs, and N is a positive integer.

A fifth aspect provides a terminal. The terminal includes a processor, a memory, and a program or instructions stored in the memory and executable on the processor, where the program or instructions, when executed by the processor, implement the steps of the method according to the first aspect.

A sixth aspect provides a terminal, including a processor and a communication interface, where the communication interface is configured to obtain indication information, where the indication information is used for indicating measurement gap configuration information of each of N bandwidth part BWPs, and N is a positive integer; and the processor is configured to perform measurement according to the measurement gap configuration information.

A seventh aspect provides a network side device. The network side device includes a processor, a memory, and a program or instructions stored in the memory and executable on the processor, where the program or instructions, when executed by the processor, implement the steps of the method according to the second aspect.

An eighth aspect provides a network side device, including a processor and a communication interface, where the communication interface is configured to send indication information, where the indication information is used for indicating measurement gap configuration information of each of N bandwidth parts BWPs, and N is a positive integer.

A ninth aspect provides a non-transitory readable storage medium, storing a program or instructions, where the program or instructions, when executed by a processor, implement the steps of the method according to the first aspect, or to implement the steps of the method according to the second aspect.

A tenth aspect provides a chip. The chip includes a processor and a communication interface, the communication interface is coupled to the processor, and the processor is configured to execute a program or instructions to implement the method according to the first aspect, or to implement the method according to the second aspect.

An eleventh aspect provides a computer program product, stored in a non-volatile storage medium, where the computer program product, when executed by at least one processor, implements the steps of the method according to the first aspect, or to implement the steps of the method according to the second aspect.

DESCRIPTION OF THE INVENTION

The technical solutions in embodiments of this application are clearly and completely described in the following with reference to the accompanying drawings in the embodiments of this application. Apparently, the described embodiments are merely some rather than all of the embodiments of this application. All other embodiments obtained by those of ordinary skill in the art based on the embodiments of this application fall within the protection scope of this application.

The specification and claims of this application, and terms "first" and "second" are used to distinguish similar objects, but are unnecessarily used to describe a specific sequence or order. It is to be understood that the terms used in this way is exchangeable in a proper case, so that the embodiments of this application described herein can be implemented in an order different from the order shown or described herein, and in addition, the objects distinguished by "first" and "second" are generally one type, and the number of the objects is not limited, for example, there may be one first object, or a plurality of first objects. In addition, "and/or" used in this specification and the claims represents at least one of the connected objects, and the character "/" generally indicates that the associated objects are in an "or" relationship.

It is worth pointing out that the technologies described in the embodiments of this application are not limited to the long term evolution (LTE)/LTE-advanced (LTE-A) systems, and may also be used in other radio communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described in this application can be applied to the systems and radio technologies mentioned above, and can also be applied to other systems and radio technologies. The following description describes a new radio (NR) system for exemplary purposes, and uses the NR terminology in most of the following description, but these techniques are also applicable to applications other than NR system applications, such as a 6$^{th}$ generation (6G) communication system.

Figures 1, 2:
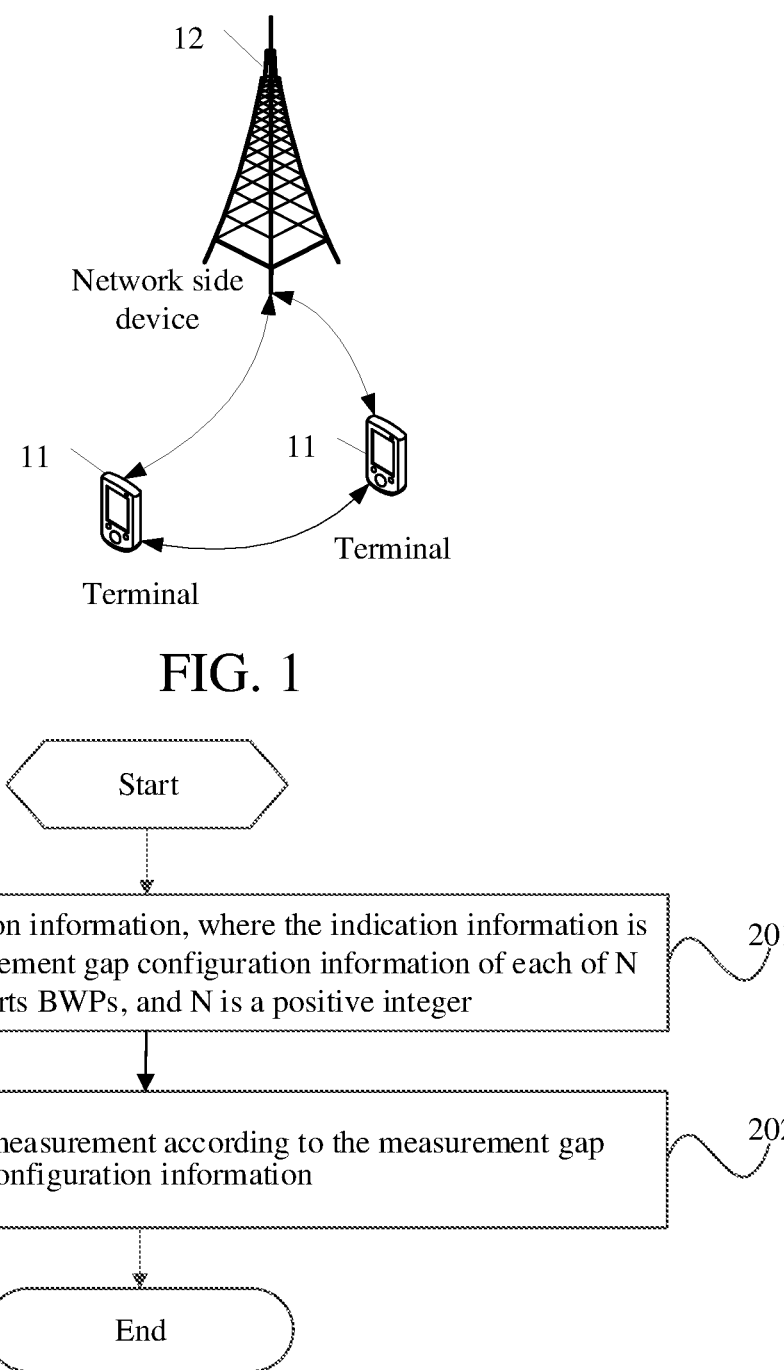
FIG. 1 is a structural diagram of a communication system to which embodiments of this application are applicable.
FIG. 2 is a schematic flowchart of an information acquisition method according to an embodiment of this application.

FIG. 1 is a structural diagram of a radio communication system to which embodiments of this application are applicable. The radio communication system includes a terminal 11 and a network side device 12. The terminal 11 may also be referred to as a terminal device or user equipment (UE), and the terminal 11 may be a terminal side device such as a mobile phone, a tablet computer, a laptop computer or referred to as a notebook computer, a personal digital assistant (PDA), a palmtop computer, a netbook, an ultramobile personal computer (UMPC), a mobile Internet device (MID), a wearable device, or vehicle user equipment (VUE), or pedestrian user equipment (PUE). The wearable device includes: a smart watch, a bracelet, a headphone, glasses, or the like. It should be noted that: the specific type of the terminal 11 is not limited in the embodiments of this application. The network side device 12 may be a base station or a core-network network device, where the base station may be referred to as a Node B, an evolved Node B, an access point, a base transceiver station (BTS), a radio base station, a radio transceiver, a basic service set (BSS), an extended service set (ESS), a node B, an evolved node B (eNB), a home node B, a home evolved node B, a wireless local area network (WLAN) access point, a wireless fidelity (WiFi) node, a transmitting receiving point (TRP), a wireless access network node, or some other appropriate terms in the field, as long as the same technical effect is achieved, the base station is not limited to a specified technical term. It should be noted that, in the embodiments of this application, for example, only a base station in an NR system is used, but a specific type of the base station is not limited.

In the related art, a measurement gap is configured based on user equipment (UE). In this way, the UE needs to use a gap to perform measurement on all bands, which causes a waste of resources (because uplink and downlink transmission cannot be performed on a measurement gap) and reduces a system throughput.

The information acquisition method provided in the embodiments of this application are described in the following with reference to the accompanying drawings through some embodiments and application scenarios thereof.

As shown in FIG. 2, an embodiment of this application provides an information acquisition method. The method includes the following steps.

Step 201: A terminal obtains indication information, where the indication information is used for indicating measurement gap configuration information of each of N bandwidth parts BWPs, and N is a positive integer.

In this step, the terminal can obtain the indication information by using radio resource control (RRC) signaling. That is, the network side device may send the indication information to the terminal by using RRC signaling.

Optionally, in this embodiment of this application, in a case that there is a plurality of types of measurement gaps, the network side device performs measurement gap configuration on each BWP, and different BWPs correspond to respective measurement gap configurations. In other words, in this embodiment of this application, the measurement gap is configured based on a BWP, for example, a BWP1 corresponds to a measurement gap configuration 1, and a BWP2 corresponds to a measurement gap configuration 2. It is worth to be pointed out that in order to reduce a signaling overhead, BWPs corresponding to a same measurement gap configuration may be configured with one measurement gap configuration, for example, the BWP1 and a BWP3 correspond to the measurement gap configuration 1, and the BWP2 corresponds to the measurement gap configuration 2; the measurement gap configuration of the BWP1 and the BWP3 may be configured by using an information element (IE) or sub-IE, and the measurement gap configuration of the BWP2 may be configured by using an IE or a sub-IE.

Step 202: The terminal performs measurement according to the measurement gap configuration information.

In the information acquisition method of this embodiment of this application, the terminal acquires indication information, and performs measurement according to the measurement gap configuration information, where the indication information is used for indicating measurement gap configuration information of each of the N bandwidth parts BWPs, that is, the measurement gap is configured based on the BWPs, and in this way, configuration may be performed according to a requirement of each BWP for a measurement gap when measuring a measurement object, for example, a corresponding measurement gap is configured only for a BWP that needs to use a measurement gap, and no measurement gap is configured for a BWP that does not need to use a measurement gap, so that a quantity of configured measurement gaps is reduced, thereby effectively avoiding resource waste and improving the system throughput.

Optionally, there may be some BWPs, in the N BWPs in this embodiment of this application, that do not need to use a measurement gap configuration, and in order to indicate which BWPs of the terminal do not need to use a measurement gap configuration, or indicate which measurement gap configuration is used by which BWP of the terminal, the measurement gap configuration information may include at least one of the following:

first configuration information, where the first configuration information is used for indicating whether to use a measurement gap in each BWP; or second configuration information, where the second configuration information is used for indicating a measurement gap identifier corresponding to each of first BWPs, and the first BWP is a BWP in the N BWPs.

The first BWP is a BWP that needs to use a measurement gap in the N BWPs.

Optionally, the first configuration information is determined according to a frequency domain location of a measurement object (MO) and a frequency domain location of the bandwidth part BWP.

Optionally, the first configuration information is used for indicating: in a case that the frequency domain location of the measurement object is within a bandwidth range corresponding to the BWP, not using the measurement gap in the BWP;

or, the first configuration information is used for indicating: in a case that the frequency domain location of at least one measurement object is outside a bandwidth range corresponding to the BWP, using the measurement gap in the BWP.

In this embodiment of this application, in a case that there is a plurality of measurement gaps, the network side device may process each measurement gap separately when configuring a relevant measurement gap for each BWP. In other words, all configured BWPs are configured based on each measurement gap, until configuration of all measurement gaps is completed. During configuration of a relevant measurement gap for a particular BWP at a particular measurement gap, in a case that all measurement objects are within a bandwidth range of the BWP in the frequency domain, it indicates not using the measurement gap in the BWP; and in a case that any measurement object is located before the bandwidth range of the BWP in the frequency domain, it indicates using the measurement gap in the BWP.

Optionally, the performing, by the terminal, measurement according to the measurement gap configuration information includes:

in a case that the second configuration information indicates that the first BWP corresponds to at least two measurement gap identifiers, selecting a measurement gap from measurement gaps corresponding to the at least two measurement gap identifiers according to a relationship between a time domain location of a measurement object and time domain locations of the measurement gaps; and performing measurement according to the selected measurement gap.

Optionally, the selecting, by the terminal, a measurement gap from measurement gaps corresponding to the at least two measurement gap identifiers according to a relationship between a time domain location of a measurement object and time domain locations of the measurement gaps includes:

selecting from the at least two measurement gaps corresponding to the at least two measurement gap identifiers, a measurement gap of which the time domain location has a highest coincidence degree with the time domain location of the measurement object.

In a first optional implementation, the indication information includes M pieces of first indication information, each piece of first indication information corresponds to a measurement gap, and each piece of first indication information is used for indicating whether to use the corresponding measurement gap in each BWP.

M is equal to a total quantity of types of measurement gaps. For example, in a case that the network device is configured with two types of measurement gaps, M is equal to 2, one of the two pieces of first indication information corresponds to a measurement gap1, and the other one corresponds to a measurement gap2.

Each piece of first indication information includes N first indication fields, where the N first indication fields are in one-to-one correspondence with the N BWPs, and each first indication field is used for indicating whether to use the corresponding measurement gap in the BWP. An $n^{th}$ first indication field of the first indication information corresponds to a BWP n, and a value of the $n^{th}$ first indication field is used for indicating using a corresponding measurement gap in the BWP n.

In a second optional implementation, the indication information includes second indication information;

the second indication information includes N second indication fields, and each second indication field corresponds to one BWP, where in a case that information in the second indication field is a first value, the second indication field indicates not using the measurement gap in the corresponding BWP; and in a case that the information in the second indication field is a second value, the second indication field is used for indicating an identifier of the measurement gap used in the corresponding BWP.

The following describes the method for indicating measurement gap configuration information below with reference to specific embodiments.

Figure 3:
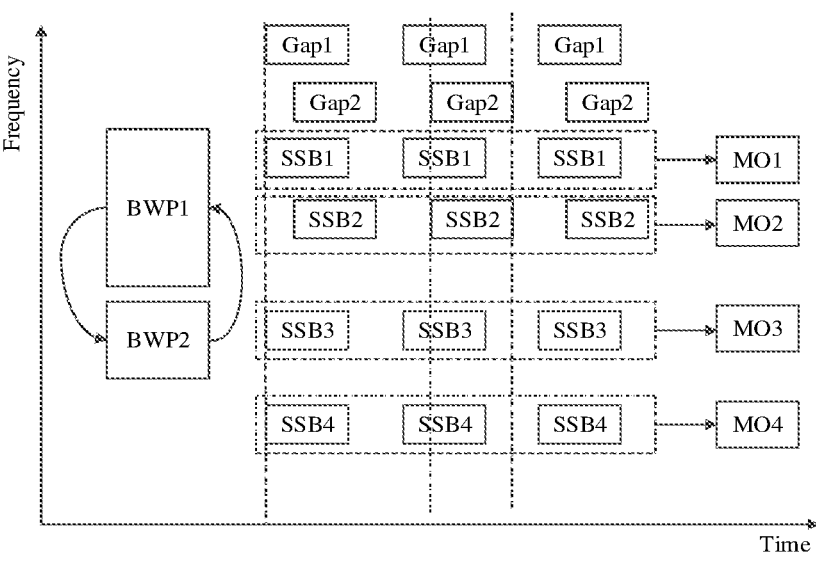
FIG. 3 is a schematic diagram of locations of measurement objects and BWPs according to an embodiment of this application.

As shown in FIG. 3, it is assumed that, a terminal may not use a measurement gap during measuring of only a first measurement object (MO1) and a second measurement object (MO2) based on a BWP1, and needs to use a measurement gap during measuring of a third measurement object (MO3) and a fourth measurement object (MO4) based on the BWP1; and the terminal may not use a measurement gap during measuring of only the MO3 based on a BWP2, and needs to use a measurement gap during measuring of the MO1, the MO2, and the MO4 based on the BWP2; and all the measurement objects (MOs) to be measured and location information of all the MOs and BWPs in a frequency domain are given in the system, where the MO1 is a synchronization signal block (Synchronization Signal and PBCH block, SSB) 1, the MO2 is an SSB2, the MO3 is an SSB3, and the MO4 is an SSB4.

In the first optional implementation:

for example, in a case that the gap does not need to be used in a particular BWP, it is indicated as 0, and in a case that the gap needs to be used, it is indicated as 1, MOs to be measured by the terminal include only the MO1 and the MO2, the total quantity of types of measurement gaps is 2 (gap1 and gap2), and a quantity of configured BWPs is 2 (BWP1 and BWP2).

In this case, the indication information includes two pieces of first indication information, and each piece of first indication information is used for indicating whether to use a corresponding measurement gap in each BWP. Each piece of first indication information includes two first indication fields, and the two first indication fields are in one-to-one correspondence with the two BWPs. For example, one piece of first indication information corresponds to the gap1, and the first indication information is used for indicating whether to use the gap1 in each BWP, and the other piece of first indication information corresponds to the gap2 and is used for indicating whether to use the gap2 in each BWP. In this indication method, the first configuration information is explicitly indicated, and the second configuration information is implicitly indicated.

Optionally, indication may be performed in the following method:

BWP gap index (BWPGapInd)=[0 (indicator for BWP1); 1 (indicator for BWP2)], corresponding to gap1 (for gap1); and BWP gap index (BWPGapInd)=[0; 1], corresponding to gap2 (for gap2).

BWPGapInd indicates the first indication information, the first indication information includes two first indication fields, the 1st field of the two first indication fields corresponds to the BWP1, and the 2nd field thereof corresponds to the BWP2. For the gap1, a value of 0 in the 1st field of the two first indication fields means not using the gap1 in the BWP1, and a value of 1 in the 2nd field thereof means using the gap1 in the BWP2. For the gap2, a value of 0 in the 1st field means not using the gap2 in the BWP1, and a value of 1 in the 2nd field thereof means using the gap2 is in the BWP2.

Still for example, in a case that the MOs to be measured by the terminal include only the MO1, indication may be performed in the following method:

BWPGapInd=[0; 1], (for gap1); and

BWPGapInd=[0; 0], (for gap2).

For the gap1, a value of 0 in the 1st field of the two first indication fields means not using the gap1 in the BWP1, and a value of 1 in the 2nd field thereof means using the gap1 in the BWP2. For the gap2, a value of 0 in the 1st field of the two first indication fields means not using the gap2 in the BWP1, and a value of 0 in the 2nd field thereof means not using the gap2 is in the BWP2. Here, for the BWP2 that needs to use a gap, the gap used in the BWP2 is selected according to a coincidence degree between a time domain location of the MO1 and time domain locations of gaps. As shown in FIG. 3, the coincidence degree of the MO1 and the gap1 in the time domain location is higher than the coincidence degree of the MO1 and the gap2 in the time domain location, and therefore, the gap1 is selected for the BWP2.

Still yet for example, in a case that the MOs to be measured by the terminal include only the MO3, indication may be performed in the following method:

BWPGapInd=[1; 0], (for gap1); and

BWPGapInd=[1; 0], (for gap2).

For the gap1, a value of 1 in the 1st field of the two first indication fields means using the gap1 in the BWP1, and a value of 0 in the 2nd field thereof means not using the gap1 in the BWP2. For the gap2, a value of 1 in the 1st field of the two first indication fields means using the gap2 in the BWP1, and a value of 0 in the 2nd field of the two first indication fields means not using the gap2 is in the BWP2. Here, for the BWP1, the gap1 or the gap2 may be used for measuring the MO3.

Still yet for example, in a case that the MOs to be measured by the terminal include only the MO4, indication may be performed in the following method:

BWPGapInd=[1; 1], (for gap1); and

BWPGapInd=[1; 1], (for gap2).

A configuration principle thereof is as described above. As long as a frequency domain location of any MO is located outside a bandwidth of a BWP, it is determined to use a gap in the BWP. A use of the gap1 or the gap2 may be determined based on implementation by a terminal.

Still yet for example, in a case that the MOs to be measured by the terminal include only the MO4, indication may be performed in the following method:

BWPGapInd=[1; 1], (for gap1); and

BWPGapInd=[0; 0], (for gap2).

This method, in comparison with the above, clearly indicates the use of the gap1 to measure the MO4 in both the BWP1 and the BWP2.

In the second optional implementation, it is assumed that for N BWPs and M gaps, identifiers for gaps being 1 to M, indication may be performed in the following method:

BWPGapInd=[$X_1$, $X_2$, . . . $X_n$ . . . , $X_N$].

$X_n$=0 indicates not using a gap in a BWPn, and $X_n$=1 to M indicates an identifier of the gap used in the BWPn, for example, $X_n$=M indicate that a gap with an identifier M is used in the BWPn.

In the indication method, in a case of indicating using a gap, the second configuration information is explicitly indicated, and the first configuration information is implicitly indicated; and in a case of indicating not using a gap, the first configuration information is explicitly indicated.

In the information acquisition method of this embodiment of this application, indication information is acquired, and measurement is performed according to the measurement gap configuration information, where the indication information is used for indicating measurement gap configuration information of each of the N bandwidth parts BWPs, that is, the measurement gap is configured based on the BWPs, and in this way, configuration may be performed according to a requirement of each BWP for a measurement gap when measuring a measurement object, for example, a corresponding measurement gap is configured only for a BWP that needs to use a measurement gap, and no measurement gap is configured for a BWP that does not need to use a measurement gap, so that a quantity of configured measurement gaps is reduced, thereby effectively avoiding resource waste and improving the system throughput.

Figure 4:
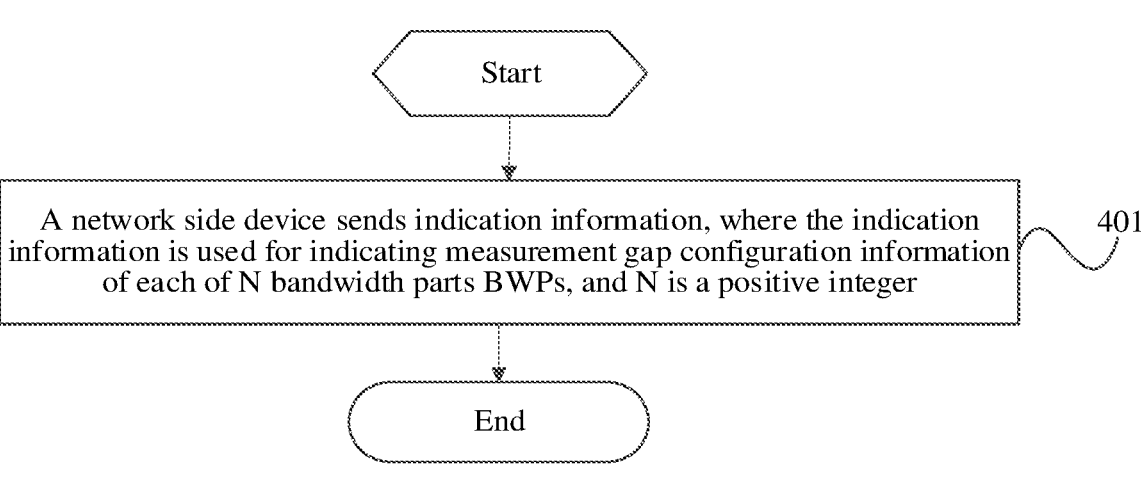
FIG. 4 is a schematic flowchart of an information configuration method according to an embodiment of this application.

As shown in FIG. 4, an embodiment of this application provides an information configuration method, including the following steps.

Step 401: A network side device sends indication information, where the indication information is used for indicating measurement gap configuration information of each of N bandwidth parts BWPs, and N is a positive integer.

In this step, the indication information may be sent by using RRC signaling.

In a case that there is a plurality of types of measurement gaps, the network side device performs measurement gap configuration on each BWP. In other words, in this embodiment of this application, the measurement gap is configured based on a BWP.

In this embodiment of this application, the indication information is used for indicating measurement gap configuration information of each of the N bandwidth parts BWPs, that is, the measurement gap is configured based on the BWPs, and in this way, configuration may be performed according to a requirement of each BWP for a measurement gap when measuring a measurement object, for example, a corresponding measurement gap is configured only for a BWP that needs to use a measurement gap, and no measurement gap is configured for a BWP that does not need to use a measurement gap, so that a quantity of configured measurement gaps is reduced, thereby effectively avoiding resource waste and improving the system throughput.

Optionally, the measurement gap configuration information includes at least one of the following:

first configuration information, where the first configuration information is used for indicating whether to use a measurement gap in each BWP; or second configuration information, where the second configuration information is used for indicating a measurement gap identifier corresponding to each of first BWPs, and the first BWP is a BWP in the N BWPs.

Optionally, before the sending, by a network side device, indication information, the method further includes:

determining the first configuration information according to a frequency domain location of a measurement object and a frequency domain location of a BWP.

Optionally, the determining the first configuration information according to a frequency domain location of a measurement object and a frequency domain location of a BWP includes:

in a case that the frequency domain location of the measurement object is within the bandwidth range corresponding to the BWP, determining that the first configuration information is first information;

or in a case that the frequency domain location of at least one measurement object is outside the bandwidth range corresponding to the BWP, determining that the first configuration information is second information, where the first information is used for indicating not using a measurement gap in the BWP, and the second information is used for indicating using the measurement gap in the BWP.

In this embodiment of this application, in a case that there is a plurality of types of measurement gaps, the network side device performs measurement gap configuration on each BWP, and different BWPs correspond to respective measurement gap configurations. In other words, in this embodiment of this application, the measurement gap is configured based on a BWP, for example, a BWP1 corresponds to a measurement gap configuration 1, and a BWP2 corresponds to a measurement gap configuration 2. It is worth to be pointed out that in order to reduce a signaling overhead, BWPs corresponding to a same measurement gap configuration may be configured with one measurement gap configuration, for example, the BWP1 and a BWP3 correspond to the measurement gap configuration 1, and the BWP2 corresponds to the measurement gap configuration 2; the measurement gap configuration of the BWP1 and the BWP3 may be configured by using an information element (IE) or sub-IE, and the measurement gap configuration of the BWP2 may be configured by using an IE or a sub-IE.

Optionally, before the sending, by a network side device, indication information, the method further includes:

determining the second configuration information according to a time domain location of a measurement object and a time domain location of the measurement gap.

Optionally, the determining the second configuration information according to a time domain location of a measurement object and a time domain location of the measurement gap includes:

selecting, from the at least two measurement gaps, a measurement gap of which the time domain location has a highest coincidence degree with the time domain location of the measurement object; and determining an identifier of the selected measurement gap as the second configuration information.

In a first optional implementation, the indication information includes M pieces of first indication information, each piece of first indication information corresponds to a measurement gap, and each piece of first indication information is used for indicating whether to use the corresponding measurement gap in each BWP.

M is equal to a total quantity of types of measurement gaps.

Optionally, each piece of first indication information includes N first indication fields, where the N first indication fields are in one-to-one correspondence with the N BWPs, and each first indication field is used for indicating whether to use the corresponding measurement gap in the BWP.

In the second optional implementation, the indication information includes second indication information;

the second indication information includes N second indication fields, and each second indication field corresponds to one BWP, where in a case that information in the second indication field is a first value, the second indication field indicates not using the measurement gap in the corresponding BWP; and in a case that the information in the second indication field is a second value, the second indication field is used for indicating an identifier of the measurement gap used in the corresponding BWP.

In this embodiment of this application, in a case that there is a plurality of measurement gaps, the network side device may process each measurement gap separately when configuring a relevant measurement gap for each BWP. In other words, all configured BWPs are configured based on each measurement gap, until configuration of all measurement gaps is completed. During configuration of a relevant measurement gap for a particular BWP at a particular measurement gap, in a case that all measurement objects are within a bandwidth range of the BWP in the frequency domain, it indicates not using the measurement gap in the BWP; and in a case that any measurement object is located before the bandwidth range of the BWP in the frequency domain, it indicates using the measurement gap in the BWP.

It should be noted that: the information acquisition method provided in the embodiments of this application may be executed by the information acquisition apparatus, or a control module in the information acquisition apparatus for executing the information acquisition method. In the embodiments of this application, the information acquisition apparatus provided in the embodiments of this application is described by using the information acquisition apparatus executing the information acquisition method as an example.

Figure 5:
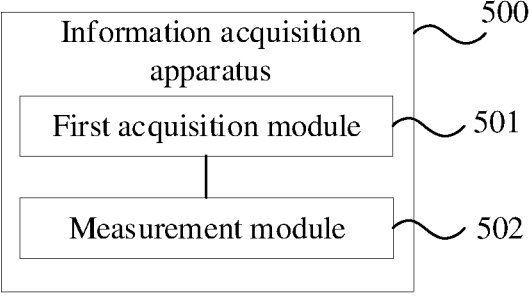
FIG. 5 a schematic diagram of modules of an information acquisition apparatus according to an embodiment of this application.

As shown in FIG. 5, an embodiment of this application provides an information acquisition apparatus 500, including:

a first acquisition module 501, configured to obtain indication information, where the indication information is used for indicating measurement gap configuration information of each of N bandwidth parts BWPs, and N is a positive integer; and a measurement module 502, configured to perform measurement according to the measurement gap configuration information.

Optionally, the measurement gap configuration information includes at least one of the following:

first configuration information, where the first configuration information is used for indicating whether to use a measurement gap in each BWP; or second configuration information, where the second configuration information is used for indicating a measurement gap identifier corresponding to each of first BWPs, and the first BWP is a BWP in the N BWPs.

Optionally, the first configuration information is determined according to a frequency domain location of a measurement object and a frequency domain location of the bandwidth part BWP.

Optionally, the first configuration information is used for indicating: in a case that the frequency domain location of the measurement object is within a bandwidth range corresponding to the BWP, not using the measurement gap in the BWP;

or, the first configuration information is used for indicating: in a case that the frequency domain location of at least one measurement object is outside a bandwidth range corresponding to the BWP, using the measurement gap in the BWP.

Optionally, the measurement module includes:

a first selection sub-module, configured to: in a case that the second configuration information indicates that the first BWP corresponds to at least two measurement gap identifiers, select a measurement gap from measurement gaps corresponding to the at least two measurement gap identifiers according to a relationship between a time domain location of a measurement object and time domain locations of the measurement gaps; and a measurement sub-module, configured to perform measurement according to the selected measurement gap.

Optionally, the first selection sub-module is configured to select, from the at least two measurement gaps corresponding to the at least two measurement gap identifiers, a measurement gap of which the time domain location has a highest coincidence degree with the time domain location of the measurement object.

Optionally, the indication information includes M pieces of first indication information, each piece of first indication information corresponds to a measurement gap, and each piece of first indication information is used for indicating whether to use the corresponding measurement gap in each BWP, where M is equal to a total quantity of types of measurement gaps.

Optionally, each piece of first indication information includes N first indication fields, where the N first indication fields are in one-to-one correspondence with the N BWPs, and each first indication field is used for indicating whether to use the corresponding measurement gap in the BWP.

Optionally, the indication information includes second indication information;

the second indication information includes N second indication fields, and each second indication field corresponds to one BWP, where in a case that information in the second indication field is a first value, the second indication field indicates not using the measurement gap in the corresponding BWP; and in a case that the information in the second indication field is a second value, the second indication field is used for indicating an identifier of the measurement gap used in the corresponding BWP.

In this embodiment of this application, indication information is acquired, and measurement is performed according to the measurement gap configuration information, where the indication information is used for indicating measurement gap configuration information of each of the N bandwidth parts BWPs, that is, the measurement gap is configured based on the BWPs, and in this way, configuration may be performed according to a requirement of each BWP for a measurement gap when measuring a measurement object, for example, a corresponding measurement gap is configured only for a BWP that needs to use a measurement gap, and no measurement gap is configured for a BWP that does not need to use a measurement gap, so that a quantity of configured measurement gaps is reduced, thereby effectively avoiding resource waste and improving the system throughput.

The information acquisition apparatus in this embodiment of this application may be an apparatus, an apparatus or electronic device having an operating system, or may be a component, an integrated circuit, or a chip in a terminal. The apparatus or the electronic device may be a mobile terminal or a non-mobile terminal. Exemplarily, the mobile terminal may include, but is not limited to, the types of the terminal 11 listed above, and the non-mobile terminal may be a server, a network attached storage (NAS), a personal computer (PC), a television (TV), an automatic teller machine, a self-service machine, or the like, which are not specifically limited in this embodiment of this application.

The apparatus provided in this embodiment of this application can implement each process implemented in the method embodiment shown in FIG. 2, and in addition, the same technical effect can be achieved. To avoid repetition, details are not described herein again.

Figure 6:
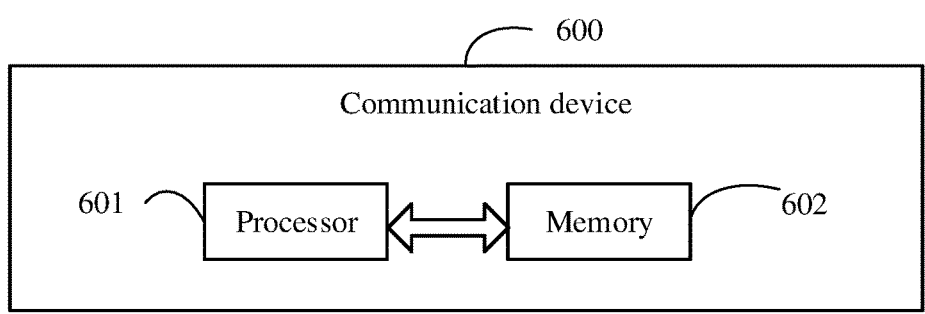
FIG. 6 is a structural block diagram of a communication device according to an embodiment of this application.

Optionally, as shown in FIG. 6, an embodiment of this application further provides a communication device 600, including a processor 601, a memory 602, a program or instructions stored in the memory 602 and executable on the processor 601. For example, in a case that the communication device 600 is a terminal, the program or the instructions, when executed by the processor 601, implement the processes of the information acquisition method applied to a terminal, and in addition, the same technical effect can be achieved. In a case that the communication device 600 is a network side device, the program or the instructions, when executed by the processor 601, implement the processes of the information configuration method applied to the network side device, and in addition, the same technical effect can be achieved. To avoid repetition, details are not described herein.

An embodiment of this application further provides a terminal, including a processor and a communication interface. The communication interface is configured to: obtain indication information, where the indication information is used for indicating measurement gap configuration information of each of N bandwidth parts BWPs, and N is a positive integer. The processor is configured to perform measurement according to the measurement gap configuration information.

Figure 7:
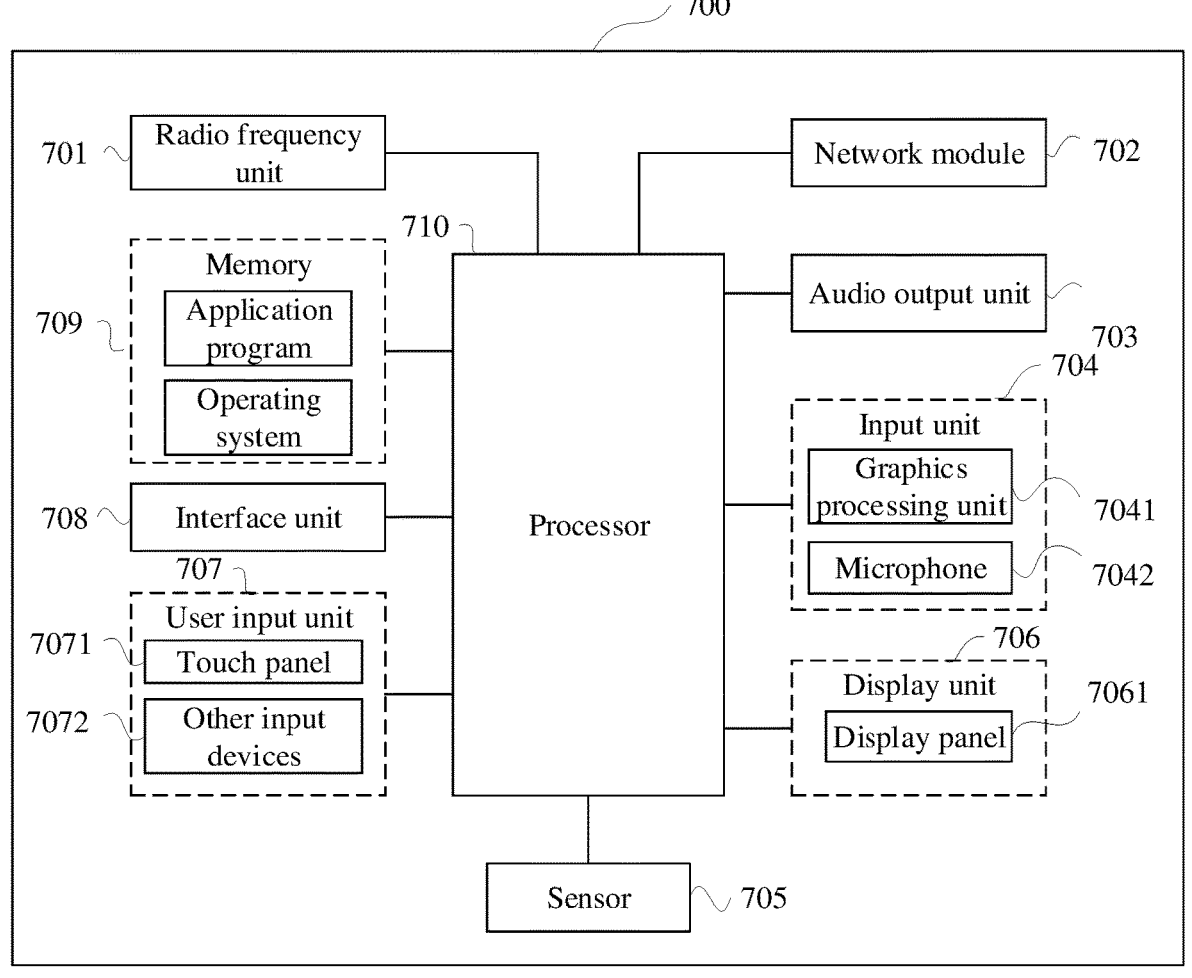
FIG. 7 is a structural block diagram of a terminal according to an embodiment of this application.

The terminal embodiment corresponds to the terminal side method embodiment, the implementation processes and implementations of the foregoing method embodiments can be applied to the terminal embodiment, and in addition the same technical effect can be achieved. Optionally, FIG. 7 is a schematic structural diagram of a hardware structure of a terminal for implementing an embodiment of this application. The terminal 700 includes, but is not limited to, at least part of components of a radio frequency unit 701, a network module 702, an audio output unit 703, an input unit 704, a sensor 705, a display unit 706, a user input unit 707, an interface unit 708, a memory 709, a processor 710, or the like.

A person skilled in the art may understand that the terminal 700 may further include a power supply (such as a battery) for supplying power to the components. The power supply may be logically connected to the processor 710 by a power management system, thereby implementing functions such as charging, discharging, and power consumption management by using the power management system. The terminal structure shown in FIG. 7 constitutes no limitation on the terminal, and the terminal may include more or fewer components than those shown in the figure, or some components may be combined, or a different component deployment may be used, which are not described herein again.

It should be understood that, in this embodiment of this application, the input unit 704 may include a graphics processing unit (GPU) 7041 and a microphone 7042. The graphics processing unit 7041 performs processing on image data of a static picture or a video that is obtained by an image capture apparatus (for example, a camera) in a video capture mode or an image capture mode. The display unit 706 may include a display panel 7061, and the display panel 7061 may be configured in the form of a liquid crystal display, an organic light emitting diode, or the like. The user input unit 707 includes a touch panel 7071 and other input devices 7072. The touch panel 7071 is also referred to as a touch-screen. The touch panel 7071 may include two parts: a touch detection apparatus and a touch controller. Specifically, the other input devices 7072 may include, but are not limited to, a physical keyboard, a functional key (such as a volume control key or a switch key), a track ball, a mouse, and a joystick, which are not described herein in detail.

In this embodiment of this application, after receiving downlink data from the network side device, the radio frequency unit 701 sends the information to the processor 710 for processing. In addition, uplink data is sent to the network side device. Generally, the radio frequency unit 701 includes, but is not limited to, an antenna, at least one amplifier, a transceiver, a coupler, a low noise amplifier, a duplexer, and the like.

The memory 709 is configured to store a software program or instructions, and various data. The memory 709 may mainly include a program or instruction storage area and a data storage area. The program or instruction storage area may store an operating system, an application program or instructions required by at least one function (for example, a sound playback function and an image playback function), and the like. In addition, the memory 709 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other non-volatile solid-state storage device.

The processor 710 may include one or more processing units. Optionally, the processor 710 integrate an application processor and a modem processor, where the application processor mainly processes an operating system, a user interface, an application program, or instructions, and the like, and the modem processor mainly processes radio communications, for example, a baseband processor. It can be understood that, the modem processor may not be integrated into the processor 710.

The radio frequency unit 701 is configured to obtain indication information, where the indication information is used for indicating measurement gap configuration information of each of N bandwidth parts BWPs, and N is a positive integer.

The processor 710 is configured to perform measurement according to the measurement gap configuration information.

Optionally, the measurement gap configuration information includes at least one of the following:

first configuration information, where the first configuration information is used for indicating whether to use a measurement gap in each BWP; or second configuration information, where the second configuration information is used for indicating a measurement gap identifier corresponding to each of first BWPs, and the first BWP is a BWP in the N BWPs.

Optionally, the first configuration information is determined according to a frequency domain location of a measurement object and a frequency domain location of the bandwidth part BWP.

Optionally, the first configuration information is used for indicating: in a case that the frequency domain location of the measurement object is within a bandwidth range corresponding to the BWP, not using the measurement gap in the BWP;

or, the first configuration information is used for indicating: in a case that the frequency domain location of at least one measurement object is outside a bandwidth range corresponding to the BWP, using the measurement gap in the BWP.

Optionally, the processor 710 is configured to: in a case that the second configuration information indicates that the first BWP corresponds to at least two measurement gap identifiers, select a measurement gap from measurement gaps corresponding to the at least two measurement gap identifiers according to a relationship between a time domain location of a measurement object and time domain locations of the measurement gaps; and perform measurement according to the selected measurement gap.

Optionally, the processor 710 is configured to select, from the at least two measurement gaps corresponding to the at least two measurement gap identifiers, a measurement gap of which the time domain location has a highest coincidence degree with the time domain location of the measurement object.

Optionally, the indication information includes M pieces of first indication information, each piece of first indication information corresponds to a measurement gap, and each piece of first indication information is used for indicating whether to use the corresponding measurement gap in each BWP, where M is equal to a total quantity of types of measurement gaps.

Optionally, each piece of first indication information includes N first indication fields, where the N first indication fields are in one-to-one correspondence with the N BWPs, and each first indication field is used for indicating whether to use the corresponding measurement gap in the BWP.

Optionally, the indication information includes second indication information;

the second indication information includes N second indication fields, and each second indication field corresponds to one BWP, where in a case that information in the second indication field is a first value, the second indication field indicates not using the measurement gap in the corresponding BWP; and in a case that the information in the second indication field is a second value, the second indication field is used for indicating an identifier of the measurement gap used in the corresponding BWP.

In this embodiment of this application, the terminal obtains indication information, and performs measurement according to the measurement gap configuration information, where the indication information is used for indicating measurement gap configuration information of each of the N bandwidth parts BWPs, that is, the measurement gap is configured based on the BWPs, and in this way, configuration may be performed according to a requirement of each BWP for a measurement gap when measuring a measurement object, for example, a corresponding measurement gap is configured only for a BWP that needs to use a measurement gap, and no measurement gap is configured for a BWP that does not need to use a measurement gap, so that a quantity of configured measurement gaps is reduced, thereby effectively avoiding resource waste and improving the system throughput.

It should be noted that: the information configuration method provided in this embodiment of this application may be executed by an information configuration apparatus, or a control module in the information configuration apparatus for executing the information configuration method. In the embodiments of this application, the information configuration apparatus provided in the embodiments of this application is described by using the information configuration apparatus executing the information configuration method as an example.

Figure 8:
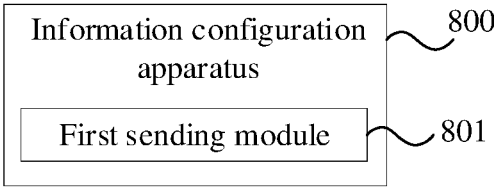
FIG. 8 is schematic diagram of modules of an information configuration apparatus according to an embodiment of this application.

As shown in FIG. 8, an embodiment of this application further provides an information configuration apparatus 800, including:

a first sending module 801, configured to send indication information, where the indication information is used for indicating measurement gap configuration information of each of N bandwidth parts BWPs, and N is a positive integer.

Optionally, the apparatus of this embodiment of this application further includes:

a third determining module, configured to determine the indication information before the first sending module sends the indication information.

Optionally, the measurement gap configuration information includes at least one of the following:

first configuration information, where the first configuration information is used for indicating whether to use a measurement gap in each BWP; or second configuration information, where the second configuration information is used for indicating a measurement gap identifier corresponding to each of first BWPs, and the first BWP is a BWP in the N BWPs.

Optionally, the apparatus of this embodiment of this application further includes:

a first determining module, configured to: before the first sending module sends the indication information, determine the first configuration information according to a frequency domain location of a measurement object and a frequency domain location of a BWP.

Optionally, the first determining module is configured to: in a case that the frequency domain location of the measurement object is within the bandwidth range corresponding to the BWP, determine that the first configuration information is first information;

or in a case that the frequency domain location of at least one measurement objects is outside the bandwidth range corresponding to the BWP, determining that the first configuration information is second information, where the first information is used for indicating not using a measurement gap in the BWP, and the second information is used for indicating using the measurement gap in the BWP.

Optionally, the apparatus of this embodiment of this application further includes:

a second determining module, configured to: before the first sending module sends the indication information, determine the second configuration information according to a time domain location of the measurement object and a time domain location of the measurement gap.

Optionally, the second determining module includes:

a second selection sub-module, configured to select, from the at least two measurement gaps, a measurement gap of which the time domain location has a highest coincidence degree with the time domain location of the measurement object; and a determining sub-module, configured to determine an identifier of the selected measurement gap as the second configuration information.

Optionally, the indication information includes M pieces of first indication information, each piece of first indication information corresponds to a measurement gap, and each piece of first indication information is used for indicating whether to use the corresponding measurement gap in each BWP, where M is equal to a total quantity of types of measurement gaps.

Optionally, each piece of first indication information includes N first indication fields, where the N first indication fields are in one-to-one correspondence with the N BWPs, and each first indication field is used for indicating whether to use the corresponding measurement gap in the BWP.

Optionally, the indication information includes second indication information;

the second indication information includes N second indication fields, and each second indication field corresponds to one BWP, where in a case that information in the second indication field is a first value, the second indication field indicates not using the measurement gap in the corresponding BWP; and in a case that the information in the second indication field is a second value, the second indication field is used for indicating an identifier of the measurement gap used in the corresponding BWP.

In the information configuration apparatus in this embodiment of this application, the indication information is used for indicating measurement gap configuration information of each of the N bandwidth parts BWPs, that is, the measurement gap is configured based on the BWPs, and in this way, configuration may be performed according to a requirement of each BWP for a measurement gap when measuring a measurement object, for example, a corresponding measurement gap is configured only for a BWP that needs to use a measurement gap, and no measurement gap is configured for a BWP that does not need to use a measurement gap, so that a quantity of configured measurement gaps is reduced, thereby effectively avoiding resource waste and improving the system throughput.

An embodiment of this application further provides a network side device, including a processor and a communication interface, where the communication interface is configured to send indication information, where the indication information is used for indicating measurement gap configuration information of each of N bandwidth parts BWPs, and N is a positive integer. The network side device embodiment corresponds to the network side device method embodiment, the implementation processes and implementations of the foregoing method embodiments can be applied to the network side device embodiment, and in addition the same technical effect can be achieved.

Figure 9:
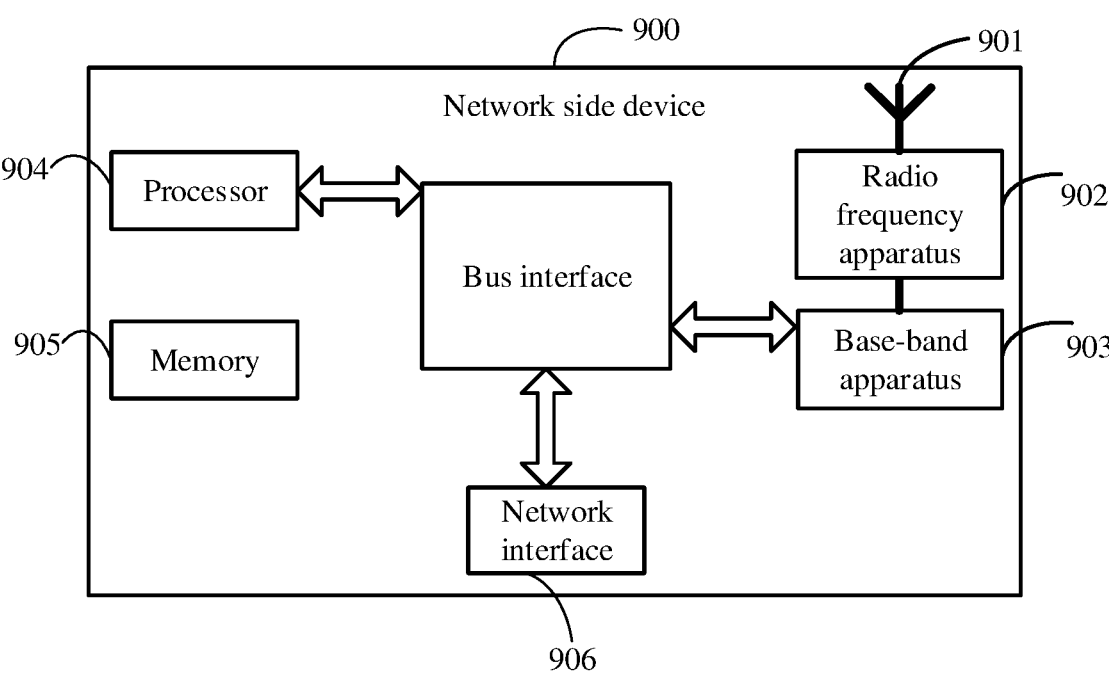
FIG. 9 is a structural block diagram of a network side device according to an embodiment of this application.

Optionally, an embodiment of this application further provides a network side device. As shown in FIG. 9, the network device 900 includes: an antenna 901, a radio frequency apparatus 902, and a base-band apparatus 903. The antenna 901 is connected to the radio frequency device 902. In an uplink direction, the radio frequency apparatus 902 receives information through the antenna 901, and sends the received information to the base-band apparatus 903 for processing. In a downlink direction, the base-band apparatus 903 processes information to be sent and sends the information to the radio frequency apparatus 902, and the radio frequency apparatus 902 processes the received information and sends the information through the antenna 901.

The frequency band processing apparatus may be located in the base-band apparatus 903, the method performed by the network side device in the foregoing embodiments may be implemented in the base-band apparatus 903, and the base-band apparatus 903 includes a processor 904 and a memory 905.

For example, the base-band apparatus 903 may include at least one base-band board, and the base-band board is provided with a plurality of chips. As shown in FIG. 9, one of the chips is, for example, a processor 904, and is connected to the memory 905, to invoke a program in the memory 905 to perform an operation of a network side device in the foregoing method embodiment.

The base-band apparatus 903 may also include a network interface 906 for information exchange with the radio frequency apparatus 902, and the interface is, for example, a common public radio interface (CPRI).

Optionally, the network side device of this embodiment of the present application further includes: instructions or a program stored in the memory 905 and executable on the processor 904, where the processor 904 invokes the instructions or the program in the memory 905 to perform the method performed by the modules shown in FIG. 8, and in addition the same technical effect is achieved. To avoid repetition, details are not described herein.

An embodiment of this application further provides a non-transitory readable storage medium. The non-transitory readable storage medium is nonvolatile. A program or instructions are stored in the non-transitory readable storage medium, where the program or instructions, when executed by a processor, implement the processes of the foregoing information acquisition method or information configuration method embodiments, and in addition the same technical effect can be achieved. To avoid repetition, details are not described herein.

The processor is the processor in the terminal described in the foregoing embodiment. The non-transitory readable storage medium includes a non-transitory computer-readable storage medium, for example, a computer read-only memory (ROM), a random access memory (RAM), a disk, or an optical disk.

An embodiment of this application further provides a chip. The chip includes a processor and a communication interface. The communication interface is coupled to the processor. The processor is configured to run a program or instructions to implement the processes of the foregoing information acquisition method or information configuration method embodiments, and in addition, the same technical effect can be achieved. To avoid repetition, details are not described herein.

It should be understood that the chip mentioned in this embodiment of this application may also be referred to as a system-grade chip, a system chip, a chip system, or a system-on-a-chip.

An embodiment of this application further provides a computer program product, where the computer program product is stored in a non-volatile storage medium, and the computer program product, when sensor executed by at least one processor, implements the processes of the foregoing information acquisition method or information configuration method embodiments, and in addition, the same technical effect can be achieved. To avoid repetition, details are not described herein.

It should be noted that: the terms "include", "comprise", or any other variation thereof in this specification is intended to cover a non-exclusive inclusion, so that the stated processes, methods, objects, or apparatuses including a series of elements not only include those elements, but also include other elements not explicitly listed, or further include elements inherent to such the processes, methods, objects, or apparatuses. Without more limitations, elements defined by the sentence "including one" does not exclude that there are still other same elements in the processes, methods, objects, or apparatuses. In addition, it should be pointed out that the scope of the method and apparatus in the embodiments of this application is not limited to performing functions in the order shown or discussed, and may also include performing functions in a substantially simultaneous manner or in a reverse order based on the functions involved. For example, the described methods may be performed in an order different from the described order, and various steps may be added, omitted, or combined. In addition, the features described with reference to some examples can be combined in other examples.

According to the descriptions in the foregoing implementations, a person skilled in the art may clearly learn that the method according to the foregoing embodiments may be implemented by relying on software and a commodity hardware platform or by using hardware, and in most cases the former is the preferred. Based on such an understanding, the technical solutions of this application essentially, or the part contributing to the prior art, may be presented in the form of a software product. The computer software product is stored in a non-transitory storage medium (for example, a ROM/RAM, a magnetic disk, or an optical disc) including several instructions to enable a terminal device (which may be a mobile phone, a computer, a server, a network device, or the like) to perform the methods described in the embodiments of this application.

The embodiments of this application have been described above with reference to the accompanying drawings. This application is not limited to the embodiments described above, and the embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. An information acquisition method, comprising:
obtaining, by a terminal, indication information from a network side device, wherein
the indication information is used for indicating measurement gap configuration information of each of N bandwidth parts (BWPs), and N is a positive integer; and
performing, by the terminal, measurement according to the measurement gap configuration information; wherein
the measurement gap configuration information comprises:
first configuration information, wherein the first configuration information is used for indicating whether to use a measurement gap in each BWP; and
second configuration information, wherein the second configuration information is used for indicating a measurement gap identifier corresponding to each of first BWPs, and a first BWP is a BWP in the N BWPs; wherein
the first configuration information is determined according to a frequency domain location of a measurement object and a frequency domain location of a BWP.

2. The method according to claim 1, wherein the first configuration information is used for indicating: in a case that the frequency domain location of the measurement object is within a bandwidth range corresponding to the BWP, not using a measurement gap in the BWP;
or, the first configuration information is used for indicating: in a case that a frequency domain location of at least one measurement object is outside a bandwidth range corresponding to the BWP, using a measurement gap in the BWP.

3. The method according to claim 1, wherein the performing, by the terminal, measurement according to the measurement gap configuration information comprises:
in a case that the second configuration information indicates that the first BWP corresponds to at least two measurement gap identifiers, selecting, by the terminal, a measurement gap from measurement gaps corresponding to the at least two measurement gap identifiers according to a relationship between a time domain location of a measurement object and time domain locations of the measurement gaps; and
performing measurement according to a selected measurement gap.

4. The method according to claim 3, wherein the selecting, by the terminal, a measurement gap from measurement gaps corresponding to the at least two measurement gap identifiers according to a relationship between a time domain location of a measurement object and time domain locations of the measurement gaps comprises:
selecting, by the terminal, from at least two measurement gaps corresponding to the at least two measurement gap identifiers, a measurement gap of which a time domain location has a highest coincidence degree with the time domain location of the measurement object.

5. The method according to claim 1, wherein the indication information comprises M pieces of first indication information, each piece of first indication information corresponds to a measurement gap, and each piece of first indication information is used for indicating whether to use a corresponding measurement gap in each BWP, wherein
M is equal to a total quantity of types of measurement gaps.

6. The method according to claim 5, wherein each piece of first indication information comprises N first indication fields, wherein the N first indication fields are in one-to-one correspondence with the N BWPs, and each first indication field is used for indicating whether to use a corresponding measurement gap in the BWP.

7. The method according to claim 1, wherein the indication information comprises second indication information;
the second indication information comprises N second indication fields, and each second indication field corresponds to one BWP, wherein
in a case that information in the second indication field is a first value, the second indication field indicates not using a measurement gap in a corresponding BWP; and
in a case that the information in the second indication field is a second value, the second indication field is used for indicating an identifier of the measurement gap used in the corresponding BWP.

8. An information configuration method, comprising:
sending, by a network side device, indication information, wherein the indication information is used for indicating measurement gap configuration information of each of N bandwidth parts (BWPs), and N is a positive integer; wherein
the measurement gap configuration information comprises:
first configuration information, wherein the first configuration information is used for indicating whether to use a measurement gap in each BWP; and
second configuration information, wherein the second configuration information is used for indicating a measurement gap identifier corresponding to each of first BWPs, and a first BWP is a BWP in the N BWPs; wherein
before the sending, by a network side device, indication information, the method further comprises:
determining, by the network side device, the first configuration information according to a frequency domain location of a measurement object and a frequency domain location of a BWP.

9. The method according to claim 8, wherein the determining, by the network side device, the first configuration information according to a frequency domain location of a measurement object and a frequency domain location of a BWP comprises:
in a case that the frequency domain location of the measurement object is within a bandwidth range corresponding to the BWP, determining, by the network side device, that the first configuration information is first information;
or in a case that a frequency domain location of at least one measurement object is outside a bandwidth range corresponding to the BWP, determining, by the network side device, that the first configuration information is second information, wherein the first information is used for indicating not using a measurement gap in the BWP, and the second information is used for indicating using the measurement gap in the BWP.

10. The method according to claim 8, wherein before the sending, by a network side device, indication information, the method further comprises:

determining, by the network side device, the second configuration information according to a time domain location of a measurement object and a time domain location of a measurement gap.

11. The method according to claim 10, wherein the determining, by the network side device, the second configuration information according to a time domain location of a measurement object and a time domain location of a measurement gap comprises:

selecting, by the network side device, from at least two measurement gaps, a measurement gap of which a time domain location has a highest coincidence degree with the time domain location of the measurement object; and determining, by the network side device, an identifier of a selected measurement gap as the second configuration information.

12. The method according to claim 8, wherein the indication information comprises M pieces of first indication information, each piece of first indication information corresponds to a measurement gap, and each piece of first indication information is used for indicating whether to use a corresponding measurement gap in each BWP, wherein M is equal to a total quantity of types of measurement gaps.

13. The method according to claim 12, wherein each piece of first indication information comprises N first indication fields, wherein the N first indication fields are in one-to-one correspondence with the N BWPs, and each first indication field is used for indicating whether to use a corresponding measurement gap in the BWP.

14. The method according to claim 8, wherein the indication information comprises second indication information;

the second indication information comprises N second indication fields, and each second indication field corresponds to one BWP, wherein in a case that information in the second indication field is a first value, the second indication field indicates not using a measurement gap in a corresponding BWP; and in a case that the information in the second indication field is a second value, the second indication field is used for indicating an identifier of the measurement gap used in the corresponding BWP.

15. A terminal, comprising a processor, a memory, and a program or instructions stored in the memory and executable on the processor, wherein the program or instructions, when executed by the processor, causes the terminal to perform:

obtaining indication information from a network side device, wherein the indication information is used for indicating measurement gap configuration information of each of N bandwidth parts (BWPs), and N is a positive integer; and performing measurement according to the measurement gap configuration information; wherein the measurement gap configuration information comprises:

first configuration information, wherein the first configuration information is used for indicating whether to use a measurement gap in each BWP; and second configuration information, wherein the second configuration information is used for indicating a measurement gap identifier corresponding to each of first BWPs, and a first BWP is a BWP in the N BWPs; wherein the first configuration information is determined according to a frequency domain location of a measurement object and a frequency domain location of a BWP.

16. The terminal according to claim 15, wherein the indication information comprises M pieces of first indication information, each piece of first indication information corresponds to a measurement gap, and each piece of first indication information is used for indicating whether to use a corresponding measurement gap in each BWP, wherein M is equal to a total quantity of types of measurement gaps.

17. The terminal according to claim 16, wherein each piece of first indication information comprises N first indication fields, wherein the N first indication fields are in one-to-one correspondence with the N BWPs, and each first indication field is used for indicating whether to use a corresponding measurement gap in the BWP.

18. The terminal according to claim 15, wherein the first configuration information is used for indicating: in a case that the frequency domain location of the measurement object is within a bandwidth range corresponding to the BWP, not using a measurement gap in the BWP;

or, the first configuration information is used for indicating: in a case that a frequency domain location of at least one measurement object is outside a bandwidth range corresponding to the BWP, using a measurement gap in the BWP.

19. The terminal according to claim 15, wherein the program or instructions, when executed by the processor, causes the terminal to perform:

in a case that the second configuration information indicates that the first BWP corresponds to at least two measurement gap identifiers, selecting a measurement gap from measurement gaps corresponding to the at least two measurement gap identifiers according to a relationship between a time domain location of a measurement object and time domain locations of the measurement gaps; and performing measurement according to a selected measurement gap.

20. The terminal according to claim 19, wherein the program or instructions, when executed by the processor, causes the terminal to perform:

selecting from at least two measurement gaps corresponding to the at least two measurement gap identifiers, a measurement gap of which a time domain location has a highest coincidence degree with the time domain location of the measurement object.

* * * * *